March 20, 1962   A. E. LAKE, JR., ET AL   3,026,415
FLAW DETECTOR FOR CONTINUOUS WEB
Filed Oct. 20, 1958
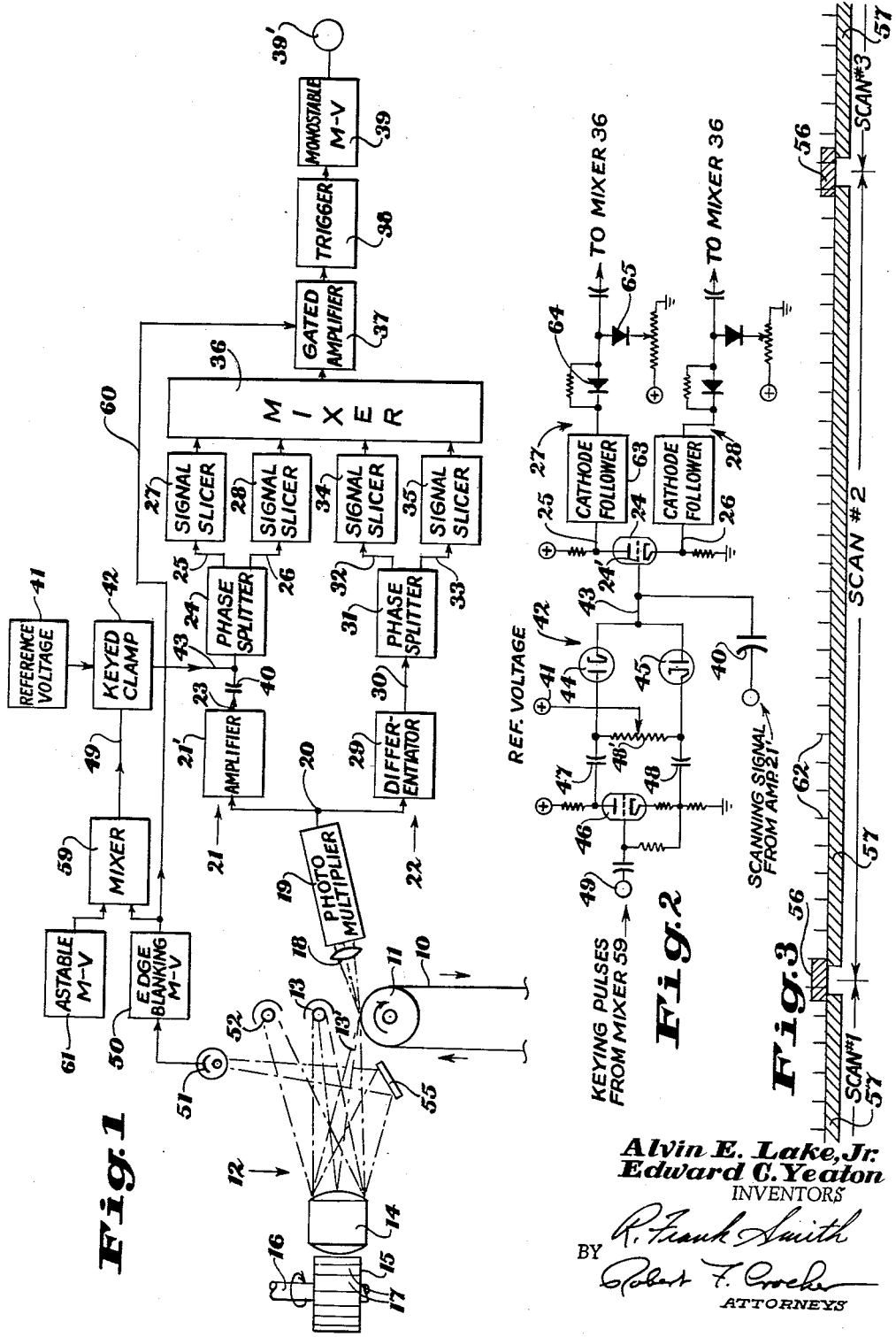
Alvin E. Lake, Jr.
Edward C. Yeaton
INVENTORS
BY
ATTORNEYS though they will appear at the output of the phase splitter
United States Patent Office
3,026,415
Patented Mar. 20, 1962

3,026,415
FLAW DETECTOR FOR CONTINUOUS WEB
Alvin E. Lake, Jr., and Edward C. Yeaton, Rochester, N.Y., assignors to Eastman Kodak Company, Rochester, N.Y., a corporation of New Jersey
Filed Oct. 20, 1958, Ser. No. 768,350
15 Claims. (Cl. 250—209)

This application relates to an improved flaw detector for use with continuous web or strip material and more particularly to such a flaw detector for detecting flaws in photographic film during manufacture thereof.

In the manufacture of continuous strip material such as photographic film it is inevitable that certain flaws will occasionally occur which, if undetected, would adversely affect the effectiveness of the film for its intended purpose. It is therefore necessary to continuously inspect the film prior to cutting it into sheets for packaging and to remove any portion of the film which has such flaws therein. While this can be accomplished by visual inspection by trained operators, such inspection is relatively slow and is subject to human error resulting from operator fatigue, etc. It has therefore become general practice to utilize apparatus for photoelectrically detecting such flaws, the apparatus normally being used in conjunction with some means to either mark the defective portion of the strip, or to control, through suitable information storage means, apparatus for automatically rejecting defective sheets cut from the web before they are packaged. Apparatus of this type is shown, for example, in Emerson U.S. Patent 2,719,235 and in Emerson U.S. application Serial No. 421,876, now abandoned. However, such devices as have heretofore been known, while vastly superior to manual inspection, still tend to miss some flaws and, in certain circumstances, to falsely indicate the presence of a flaw where none actually exists.

These deficiencies are directly or indirectly the result of several factors, among which is the tendency of any electrooptical apparatus to gradually change its characteristics due to aging, heating effects, or "drift" of the electrical component values. Moreover, variations and inaccuracies in the scanning apparatus utilized frequently cause the scanner output signal to vary between successive scans even though the film itself is uniform. The flaws which must be detected are of various types; some are of relatively small size, others may cover a relatively large area. Some of the flaws may be evidenced by an increase in light absorption, while others may be evidenced by a decrease in such light absorption characteristics.

It is an object of this invention to provide a flaw detecting apparatus capable of effectively distinguishing between those scanner signal variations indicative of any of a great variety of such flaws and those variations arising directly from inaccuracies or instability in the scanning apparatus itself and of producing a flaw-indicating signal only in response to the former. To obtain this result the apparatus of my invention utilizes two flaw-sensing channels, one of which operates on a linearly amplified signal corresponding to the scanner output and the other of which operates on a differentiated scanner output signal. In order to insure that variations in the scanner output arising from inaccuracies or instability in the scanner mechanism itself do not cause improper operation the signal level in the first channel is periodically brought to a predetermined reference level so that only variations from this reference level will pass through this particular channel. This is done by means of a keyed clamp circuit which is briefly rendered operative at least once during each scanning cycle to bring about the desired signal clamping action. Preferably the clamp keying pulses are obtained from two separate sources, one of which serves to key the clamp during the brief interval between successive scans and the other of which provides a plurality of extremely short clamping intervals spaced throughout the normal scanning cycle.

Further objects and the specific manner in which the objects are attained will become apparent from the following description and claims, especially when considered in the light of the accompanying drawing wherein:

FIG. 1 is a diagrammatic showing of our improved flaw detector;

FIG. 2 is a schematic diagram of a portion of the apparatus shown in FIG. 1;

FIG. 3 is a diagram showing the time sequence of various operations during the normal operation of the flaw detector.

As shown in FIG. 1 the flaw detector of our invention is illustrated for use in detecting flaws present in a continuously moving web or strip of photographic film 10 passing over a roller 11 at the inspection station. Located at the inspection station adjacent the drum 11 is a scanner 12 arranged to cyclically sweep a beam of light 13′ (nonactinic to the particular film being inspected) across the width of the film as it traverses the roller 11. The scanner shown is similar to that described in Emerson U.S. Patent 2,719,235, and is arranged so that light from a source 13 is directed through a suitable lens assembly 14 onto the surface of a polygonal mirror drum 15 rotatably driven by a suitable shaft 16. Each face or facet 17 of the drum will, as it rotates past the lens system 14, reflect the light from the source back through the lens 14 by which it will be focused into a relatively small scanning spot impinging on the surface of the film 10 as it traverses the roller 11. Due to the rotation of the mirror drum 15 each facet will therefore sweep a scanning spot or beam across the strip 10, the optical system being so arranged and the number and rate of movement of the facets being so correlated to the rate of movement of the film that substantially the entire surface of the film will be scanned by a continuing succession of scanning sweeps. The light reflected from the surface of the film 10 is then passed through a suitable lens 18 to a photomultiplier tube or other detector 19 so that there will appear at its output 20 a scanner output signal the value of which will at any time correspond to the reflectivity of the portion of the film being scanned at that particular instant.

The scanner signal from scanner 12 is fed, in parallel, to each of two flaw-detecting channels generally indicated at 21 and 22. The upper channel 21 includes a linear amplifier 21′ the output of which is fed as at 23 to a phase splitter 24. As is well understood by those skilled in the art, there will appear at the output of the phase splitter two signals corresponding to the scanner signal but of inverted polarity relative to one another. Each of these signals is then fed to a signal slicer 27 or 28 arranged to pass only those portions of the signal applied to its particular input which lie to one side of a predetermined clipping or slicing reference potential.

The other flaw-detecting channel 22 comprises a differentiator 29 which will produce at its output a signal corresponding to the time derivative of the scanner signal. This differentiated signal is applied as at 30 to the input of a phase splitter 31, the outputs of which are applied as at 32 and 33 to individual signal slicers 34 and 35 similar to those utilized in the upper or linear channel 21. The outputs from the four signal slicers are then combined in a mixer 36 and fed into a gated amplifier 37, the purpose of which will be later set forth. The output of amplifier 37 is applied to a trigger 38 used to control the operation of a flaw indicating unit which, in this case, may comprise a monostable multivibrator 39. The arrangement is such that a signal pulse passing through the gated amplifier 37 will cause the trigger 38 to trigger the multivibrator 39 causing the latter to generate at its output 39' a flaw-indicating pulse of predetermined voltage and duration. As was previously mentioned this pulse may be used to control any desired subsequent apparatus (not shown) such as a marking device or a rejection apparatus adapted to reject sheets cut from the strip and which contain the flaw which caused the flaw-indicating output pulse.

The level of the signal passing through the upper channel as so far described would be subject to several variations any of which could readily mask actual flaws or could itself pass through one of the slicers 27 or 28 thereby to cause generation of a flaw-indicating pulse by multivibrator 39 even though there were in fact no flaw present in the film being scanned. Thus, for example, any variation between the light-reflecting characteristics of the individual facets 17 of drum 15 would cause a corresponding variation in the signal level at the point 23. By the same token, variations arising from slight flaws in any individual facet could similarly cause variations in the signal level. Changing characteristics of the photomultiplier or of the amplifier 21' due to heating, aging, vibration, or any other cause might also cause variations in the signal level at point 23. In order to insure that any such variations will not adversely affect the operation of the detector, provision is made for clamping the signal level at the input of the phase splitter 24 to a predetermined level for brief intervals during the scanning operation. To this end, the signal from amplifier 21' is coupled to the phase splitter 24 by means of a capacitor 40, and a reference voltage obtained from a source 41 is applied to the phase splitter side of capacitor 40 by means of a keyed clamp 42 the output of which is connected as at 43 to the input of the phase splitter.

As best shown in FIG. 2 the keyed clamp comprises a pair of diodes 44 and 45 together with a phase splitter 46, the outputs from the phase splitter 46 being coupled through capacitors 47 and 48 to the diodes as clearly shown in this figure. The reference voltage is applied from the source 41 through a tapped resistor 48' bridged between the output sides of the capacitors 47 and 48. This keyed clamp is of the type shown and described in Wendt U.S. Patent No. 2,299,945 to which reference may be made for a more detailed discussion thereof. Suffice it to say that whenever a negative-going keying pulse is applied to the input 49 of the phase splitter 46 the resulting pulses at the outputs of the phase splitter will be applied through the capacitors 47 and 48 to the diodes 44 and 45 and will render these diodes conductive. This will swamp the effect of any signal passing through the capacitor 40 and will cause this capacitor to charge to a voltage such that the grid 24' of phase splitter 24 will be brought to the reference voltage level and will be maintained thereat for the duration of the keying pulse. At the end of the keying pulse, phase splitter 46 will become highly conductive and, due to the charge stored in capacitors 47 and 48, the voltages applied to the diodes 44 and 45 will then be such as to bias them into inoperative or nonconducting condition. Since the circuit through these diodes is the only grid return circuit for the phase splitter 24, the voltage on its grid will therefore remain at the reference voltage, except for variations produced by variations in the scanner signals during the brief interval until the next keying pulse.

As previously mentioned, there are preferably two separate sources of keying pulses provided for the control of the keyed clamp 42. The first of these comprises an edge blanking monostable multivibrator 50 which is adapted to generate a keying pulse (and therefore a clamping action) beginning just prior to the end of one scanning sweep and ending just after the next sweep has begun. To obtain this result the multivibrator 50 is arranged to be triggered by the output of a photoelectric cell 51 receiving light from a second non-actinic source 52. Source 52 and cell 51 are so positioned that light from the source 52 will pass through the lens system 14 onto the surface of the drum 15, then back through the lens 14 and onto a mirror 55 which reflects this light onto the cell 51, the arrangement being such that light will impinge on cell 51 during each scanning cycle just before the scanning beam from source 13 sweeps off the far side of the film 10. As indicated in FIG. 3 the resulting keying pulse from multivibrator 50, shown diagrammatically by hatched area 56, is of a duration sufficient to span the time interval between successive scanning sweeps across the film. Since it is during this period that the scanning spot reflected by one facet 17 will pass beyond the edge of the film strip and that produced by the next facet 17 will move onto the other edge of the film strip, the scanner signal variations caused by these beams traversing the edges of the film, as well as by any differences in reflective characteristics of the facets 17, will be swamped by the clamping action and the signal level appearing at the grid of phase splitter 24 will be restored to the desired reference level. Thus, variations occurring between scans will not be permitted to pass through the upper channel 21.

However, these variations may still pass through the differentiating channel 22. In order to prevent adverse action thereby, the output from the edge blanking multivibrator 50 is applied as at 60 to the gated amplifier 37, previously described, the edge blanking pulse being effective to bias gated amplifier 37 so as to render it inoperative during this interval.

The second source of clamp-keying pulses is constituted by a free-running astable multivibrator 61 which is arranged to generate a continuing series of extremely short pulses, the pulse repetition rate of which is considerably in excess of the scanning frequency. The relative frequency and duration of these last-mentioned keying pulses are graphically illustrated by the narrow lines 62 in FIG. 3. The multivibrator 61 preferably is so adjusted that the ratio of pulse repetition frequency to scanning frequency is other than a whole number. Thus, as is also indicated in FIG. 3 the location of the main scanning beam or spot on the film during the clamping intervals caused by these pulses 62 will be slightly displaced laterally of the width of the film strip on successive sweeps. This will insure that a narrow flaw extending generally lengthwise of the film will not be masked by the clamping action on successive sweeps. While obviously considerable variation is possible, in one such flaw detector built in accordance with our invention wherein the frequency of scanning sweeps was at the rate of 1440 sweeps per second, the multivibrator 61 was adjusted to operate at a pulse repetition frequency of approximately 42 kc. Each pulse was substantially one microsecond in duration. In this particular installation this corresponded to a movement of the main scanning beam across the web of about one half inch between clamping intervals, while the clamping intervals themselves each corresponded to a movement of the scanning beam of only about .02". As indicated above, these values are but for purposes of illustration and are in no sense critical or limiting. The outputs from edge blanking multivibrator 50 and free-running multivibrator 61 are conveniently combined by applying them to a mixer 59 the output of which is in turn connected to the input 49 of the keyed clamp 42.

With this arrangement variations in the signal appearing at the point 23 in channel 21, arising from defects in the individual facets 17 of the scanning drum 15 or from drift or other instability of the photomultiplier 19 or amplifier 21', will be rendered ineffective to cause adverse action of the flaw detector. Any change in signal due to these causes will ordinarily be at a relatively slow rate so that there will be very little change in signal resulting from these causes during the relative short intervals between successive clamping actions caused by pulses 62 from multivibrator 61. At each of these pulses, the voltage on the grid 24' of phase splitter 24 will be restored to the desired reference level. While, theoretically, it would be possible for an actual flaw to be scanned in the film at the very instant that the clamping action is being produced by one of the pulses 62, the likelihood of this occurring is quite remote. Moreover, any flaw small enough to be completely masked by this brief clamping action would produce at the output of the photomultiplier a voltage pulse which, while perhaps of relatively small amplitude, would necessarily have extremely rapid rise and fall characteristics. Since the differentiator 29 is responsive to the rate of change in the output from the photomultiplier, any such pulses would normally cause a sufficiently large pulse at the output of the differentiator 29 to cause operation of the flaw-indicating multivibrator 39.

While many arrangements could obviously be used for slicing or separating those portions of the signals passing through either channel 21 or 22 which represent a variation from the voltage or signal level corresponding to perfect film, the arrangement shown in FIG. 2 has been found to be very effective for this purpose. As shown therein each signal slicer comprises a cathode follower 63 the output of which is fed through a first diode 64 arranged to readily pass negative-going signals to the mixer 36. A second diode 65 is connected between the diode 64 and a source 66 of a predetermined positive voltage level which establishes the slicing or clipping level. With this arrangement only those portions of the signal appearing at the output of the cathode follower 63 and which are more negative than the slicing reference voltage will be permitted to pass to the mixer 36. Signal portions which are positive with respect to this slicing reference potential will be effectively shorted out by the diode 65. Because of the relative inversion of the signals appearing at the outputs 25 and 26 of the phase splitter 24 one of the signal slicers 27 or 28 will respond only to those flaws which produce an increase in reflectivity of light from the film while the other will respond only to those flaws which produce a decrease in reflectivity of the film. However, the outputs from all of the signal slicers will be of the same polarity so that they may readily be combined in the mixer 36 and will be equally effective to trigger the flaw-indicating multivibrator 39.

The operation of our flaw detector is believed to be clear from the preceding description. Scanning proceeds continuously as the web or strip of film moves past the inspection station. At the beginning of each sweep of the scanning beam across the strip, the edge blanking multivibrator 50 generates a keying pulse which renders the keyed clamp 42 effective to clamp the signal level applied to the input of the signal slicing means in the upper or linear channel 21 at a predetermined reference level. Any tendency of the normal signal level to creep from this established reference level during a particular scanning sweep is overcome by the periodic activation of the keyed clamp as a result of the pulses supplied from free-running multivibrator 61.

Thus, except for variations in the scanner signal caused by actual flaws in the film, the signal applied to the inputs of the two signal slicers in the upper or linear channel 21 will be effectively maintained at the reference level at all times, enabling the setting of the signal slicing level to a value sufficiently close to the clamping level that even very small signal variations, representative of relatively inconspicuous flaws, may be readily detected.

Any flaws of such character that the resulting scanner signal variation will not pass through the upper channel or located at such position on the strip as to be masked by the clamping action in the upper channel will normally produce a sufficiently large differentiated signal pulse in the lower channel 22 as to readily pass through one or the other of the signal slicers therein (depending upon the polarity of the pulse) and cause a flaw-indicating output from the multivibrator 39. Both positive-going and negative-going variations in the scanner output signal which are indicative of flaws will be equally effective in producing a flaw-indicating signal at the output terminal 39'.

Although but one embodiment of our invention has been shown and described in detail it will be obvious to those skilled in the art that many changes and substitutions can be made without departing from the spirit and scope of the invention as defined by the appended claims.

We claim:

1. A flaw detector for detecting flaws in a continuously moving web comprising electrooptical scanning means for cyclically sweeping a beam of light transversely across said web and for producing a scanning signal the value of which varies with the light absorbing characteristics of said web, signal slicing means, and means including a capacitor normally coupling said scanning signal substantially linearly to the input of said slicing means, keying pulse generating means arranged to generate during each scanning cycle and while said beam is impinging on said web at least one keying pulse of short duration compared to the length of a scanning cycle, a keyed clamp operatively controlled by said pulse generating means and connected to the input of said slicing means for maintaining the signal level at said input at a predetermined reference level for the duration of each said keying pulse, and means including said slicing means for producing a flaw-indicating signal in response to any predetermined variation of said scanning signal from said reference level.

2. A flaw detector as in claim 1 wherein said keying pulse generating means comprises a free-running pulse generator arranged to produce keying pulses at a repetition frequency considerably greater than the scanning frequency, said pulse generator being adjusted so that the ratio of pulse repetition frequency to scanning frequency is other than a whole number.

3. A flaw detector as in claim 1 wherein said keying pulse generating means comprises means operatively controlled in timed relationship with said scanning means for generating a keying pulse at the end of each sweep of said scanning beam across said web.

4. A flaw detector as in claim 3 wherein the duration and timing of said last-mentioned keying pulse is such as to maintain the signal level at the input of said slicing means at said predetermined reference level while said beam is sweeping across the marginal edge of said web at the beginning of each scanning cycle.

5. A flaw detector as in claim 3 wherein said keying pulse generating means further comprises a free-running pulse generator arranged to produce a plurality of keying pulses during each scanning cycle, and means rendering said clamp responsive to all said keying pulses.

6. A flaw detector for detecting flaws in a continuously moving web comprising electro-optical scanning means for cyclically scanning said web transversely thereof at a predetermined scanning frequency and for generating a scanning signal the amplitude of which varies with the absorption characteristics of said web, a pair of flaw-detecting channels coupled in parallel to the output of said scanning means, and flaw signalling means conjointly responsive to the outputs of said flaw detecting channels, each of said channels including signal slicing means, signal differentiating means incorporated in one of said channels between the slicing means therein and said scanner, said other channel comprising means normally applying said scanning signal substantially linearly to its associated slicing means and including a capacitor interposed between its slicing means and said scanner, and keyed clamping means connected to the side of said capacitor remote from said scanner for periodically bringing said side of said capacitor to a predetermined reference potential at least once during the web-scanning portion of each scan cycle.

7. A flaw detector as in claim 6 including a pulse generator operating in timed relationship with said scanning means for generating a keying pulse at the beginning of each scanning cycle for controlling the operation of said clamping means.

8. A flaw detector as in claim 6 including a first pulse generator operating in timed relation to said scanning means for generating a first keying pulse at the beginning of each scanning cycle and a second, free-running, pulse generator operating at a relatively high pulse repetition frequency compared to said scanning frequency, the ratio of said pulse repetition frequency to said scanning frequency being other than a whole number, and said clamping means being connected to the outputs of both said pulse generators for conjoint control thereby.

9. A flaw detector for detecting flaws in a continuously moving web comprising a source of light, optical means for forming light from said source into a scanning beam and for successively causing said beam to sweep across said web at a predetermined scanning frequency, photoelectric means arranged to receive light from said beam as modified by said web and to produce a scanner output signal the amplitude of which varies with variations in the light absorbing characteristics of said web, a pair of flaw detecting channels connected in parallel to the output of said photoelectric means, each of said channels including a phase splitter and a pair of signal slicers connected to the outputs of the phase splitters, each slicer being arranged to pass only those portions of the output signal from the phase splitter which lie to one side of a predetermined clipping reference level, one of said channels including a capacitor for coupling the scanner output signal to the input of the phase splitter in that channel, a keyed clamp connected to the phase splitter side of said capacitor and adapted when keyed to maintain the signal level at the phase splitter input at a predetermined reference level regardless of variations in said scanner output signal, and keying pulse generating means connected to said clamp and arranged to apply a keying pulse thereto at least once during each scanning cycle, the other of said channels including signal differentiating means ahead of the phase splitter therein and adapted to apply a signal to said last-mentioned phase splitter corresponding to the time derivative of said scanner output signal, a mixer connected to and conjointly responsive to the outputs of all said slicers whereby output from said mixer will occur in response to any variation in the scanner output signal indicative of a flaw in said web.

10. A flaw detector as in claim 9 wherein said keying pulse generating means includes a pulse generator arranged to produce keying pulses of relatively short duration at a repetition rate considerably greater than said scanning frequency, the ratio of said pulse repetition rate to said scanning frequency being other than a whole number.

11. A flaw detector as in claim 9 wherein said optical means is arranged to sweep said beam along a path which extends somewhat beyond the lateral edges of said web and wherein said keying pulse generating means includes a pulse generator operatively controlled in timed relation to said optical means and arranged to generate a keying pulse the leading edge of which occurs slightly before the beam leaves the one edge of said web near the end of each sweep across the web and of a duration such that its trailing edge occurs slightly after the beam sweeps onto the other edge of said web near the beginning of the next sweep across the web.

12. A flaw detector as in claim 11 wherein said keying pulse generating means further includes a second pulse generator arranged to produce extremely short duration keying pulses at a repetition rate considerably greater than said scanning frequency, the ratio of said pulse repetition rate to said scanning frequency being other than a whole number.

13. A flaw detector as in claim 1 wherein said keying pulse generating means comprises a free-running pulse generator arranged to produce keying pulses at a repetition frequency considerably greater than the scanning frequency.

14. A flaw detector as in claim 6 including a free-running pulse generator operating at a relatively high pulse repetition frequency compared to said scanning frequency, and means connecting the output of said pulse generator to said clamping means for controlling the operation of said clamping means.

15. A flaw detector as in claim 9 wherein said keying pulse generating means includes a pulse generator arranged to produce keying pulses of relatively short duration at a repetition rate considerably greater than said scanning frequency.

References Cited in the file of this patent

UNITED STATES PATENTS

| 2,617,048 | Wagner | Nov. 4, 1952 |
| 2,719,235 | Emerson | Dec. 3, 1953 |
| 2,722,156 | Warren | Nov. 1, 1955 |
| 2,753,464 | Stone | July 3, 1956 |
| 2,803,755 | Milford | Aug. 20, 1957 |